A. B. WETHERELL.
VEHICLE TIRE.
APPLICATION FILED FEB. 23, 1910.
1,050,886.
Patented Jan. 21, 1913.
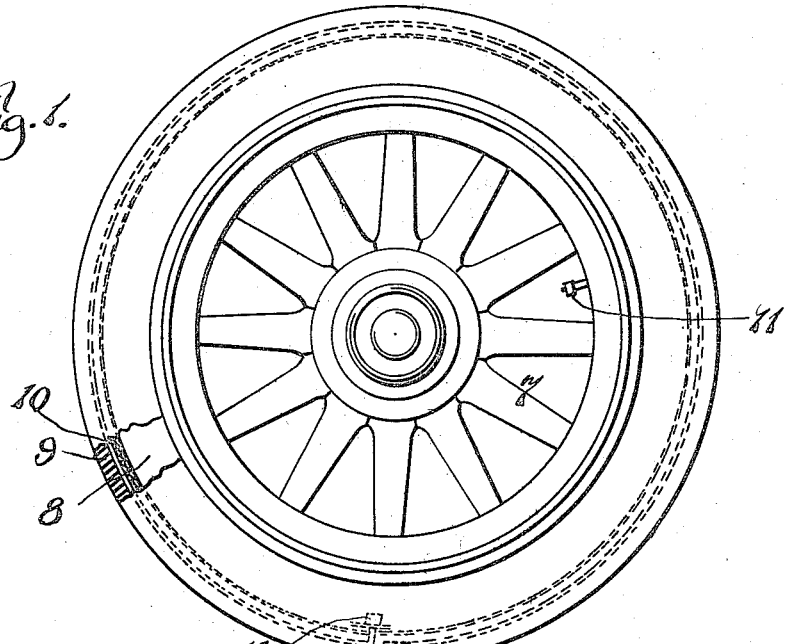
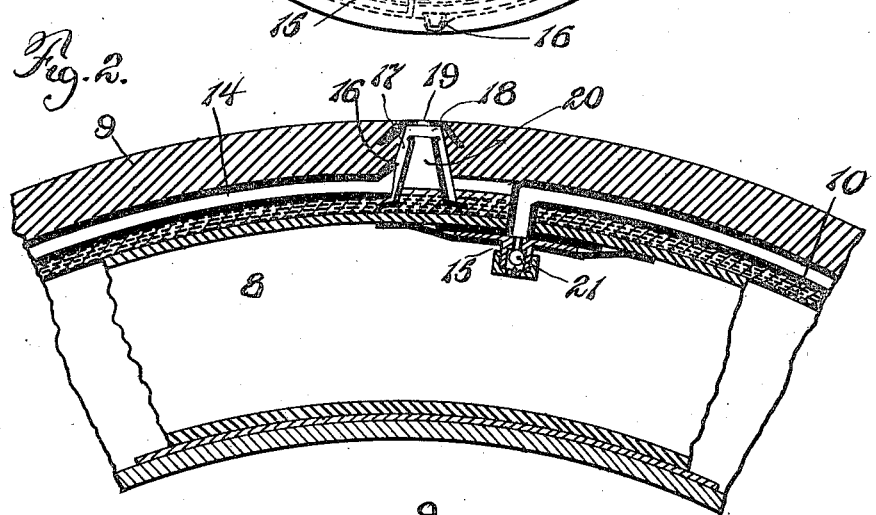
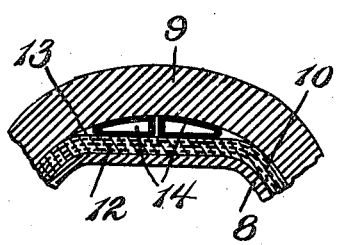
WITNESSES
INVENTOR

UNITED STATES PATENT OFFICE.

ANSON B. WETHERELL, OF PITTSBURGH, PENNSYLVANIA.

VEHICLE-TIRE.

1,050,886.   Specification of Letters Patent.   Patented Jan. 21, 1913.

Application filed February 23, 1910. Serial No. 545,404.

*To all whom it may concern:*

Be it known that I, ANSON B. WETHERELL, a citizen of the United States, residing at Pittsburgh, in the county of Allegheny and State of Pennsylvania, have invented certain new and useful Improvements in Vehicle-Tires, of which the following is a specification.

My invention has reference to vehicle tires and particularly to pneumatic tires of the self-filling type. It has for its primary objects; the provision of a self-filling pneumatic tire, which will augment the air pressure according to the weight of the vehicle, its load, and the speed with which it travels; the provision of auxiliary means within the tire for augmenting the pressure within said tire; and in general the provision of an improved self-filling pneumatic tire. These and such other objects as may hereinafter appear, or are incidental to my invention, I attain by means of a construction illustrated in preferred form in the accompanying drawings, which form a part of this specification. In the drawing, Figure 1 is a diagrammatic representation of my improvement applied to a vehicle wheel, a portion of the tire being broken away to more clearly illustrate the parts.

Figure 2 is a longitudinal section through a portion of my tire, and

Figure 3 is a transverse section through Figure 2.

In general my invention is designed to provide means in the tire itself for augmenting the pressure in the main tube of a pneumatic tire. Referring to the drawing it will be seen that I have shown my improved tire mounted on a wheel 7 of the usual character, and to which it is secured in any preferred manner. The tire is composed of an inner or main tube 8 and an outer shoe or tread 9 which is provided with a reinforcing or stiffening strip 10 of any desired design or character. The inner or main tube 8 is provided with an inlet valve 11 of the usual type. Referring now more particularly to Figure 3, it will be seen that the stiffening strip 10 has a flattened or retracted portion 12 adjacent the top of the shoe, thus forming a circumferential opening or passage 13 between the strip and the shoe. Mounted within this opening are two or more secondary tubes 14 extending around the tire, and having an inlet 15 into the main tube 8 at one end, and at the other end an intake 16 from the atmosphere. This intake consists of an air passage 17, partially closed and protected by the cap or plate 18 which is embedded in the shoe and is provided with a vent or opening 19. Within the passage 16 and carried by the stiffening strip 10 is a cup or shell 20 with its open end adjacent the vent opening 19. The chief function of the shell is to catch and retain any particles of dirt or dust which may find their way past the opening 19 as the wheel rotates. The inlet into the main or inner tube 8 from the secondary tubes comprises a ball check valve 21, which is normally adapted to restrain any flow of air from the main tube into the secondary tubes, but which permits a flow of air from the latter into the former. The intake 16 is normally open to the atmosphere, and the strip 10 is provided of sufficient stiffness to resist ordinary pressure within the main tube and thus prevents the secondary tubes from collapsing. Assuming that there is sufficient pressure in the main tube for running, the operation of my device is as follows; the instant that the intake 16 passes the position indicated in Figure 1 the weight of the vehicle compresses the shoe and collapses or closes the secondary tubes, the air contained therein being unable to escape is forced and pushed around the tire as the wheel rotates until it is forced within the main tube through the check valve 21, by which it is restrained from escaping from said main tube. With every revolution of the wheels the main tube pressure will be thus augmented, until either the pressures equalize on both sides of the check valve, or until the pressure within the main tube is sufficient to force the portion 12 of the stiffening strip 10 outwardly thereby collapsing the secondary tubes, when of course it will be apparent no air can enter.

The shell or cup 20 is preferably so constructed that when the secondary tubes are collapsed in the manner just indicated it will close the opening 19.

It is obvious that but a small amount of air entering into the secondary tubes is sufficient to augment the pressure within the main tube and to maintain such pressure at proper working basis, and it is equally obvious that the weight of the vehicle and its burden, together with the speed are important factors in the operation of my device, the faster being the speed and the heavier the load, the more effective being the operation of the compressing secondary tubes.

It is obvious that the location of the intake can be changed, and that the various parts can be altered in various ways without departing from the spirit of my invention, the chief feature of my invention being, as hereinbefore stated, the provision of auxiliary means within the tire for compressing and forcing air into the main tube of the tire.

It will also be apparent that while the preferred embodiment involves the use of a secondary compressing tube, the broad invention is not limited to the use of a tube, but contemplates the use of any and all compressing means communicating with the main tube of the tire ad operated by the weight of the vehicle upon the revolving tire.

Having thus described my invention and illustrated its use what I claim as new and desire to secure by Letters Patent is the following:—

1. A self-filling pneumatic tire comprising a main tube, a secondary collapsible tube around the outside of the main tube and open to the atmosphere at one end and at the other end to the main tube, stiffening means between the two tubes for preventing the air pressure in the main tube from collapsing the secondary tube, and means for preventing a back flow of air from the main tube to the secondary tube, the stiffening means being sufficiently yielding to permit the expansion of the main tube to force such means outward and close the secondary tube when the pressure in the main tube reaches a predetermined point.

2. A self-filling pneumatic tire comprising a main tube, a secondary collapsible tube around the outside of the main tube opening at one end to the main tube and provided at the other end with a valvular device normally holding the collapsible tube open to the atmosphere, stiffening means between the two tubes for preventing the air pressure in the main tube from collapsing the secondary tube, and means for preventing a back flow of air from the main tube to the secondary tube, said stiffening means being sufficiently yielding to permit of the expansion of the main tube to force such means outward and operate the valvular device to close the secondary collapsible tube to the atmosphere.

In testimony whereof I have hereunto signed my name in the presence of the two subscribed witnesses.

ANSON B. WETHERELL.

Witnesses:
HARVEY L. LECHNER,
IDA MAY BLAINE.